(12) United States Patent
Messenger

(10) Patent No.: US 9,448,547 B2
(45) Date of Patent: Sep. 20, 2016

(54) SENSOR AND POWER COORDINATOR FOR VEHICLES AND PRODUCTION LINES THAT HOSTS REMOVABLE COMPUTING AND MESSAGING DEVICES

(71) Applicant: Brian S. Messenger, Monte Sereno, CA (US)

(72) Inventor: Brian S. Messenger, Monte Sereno, CA (US)

( * ) Notice: Subject to any disclaimer, the term of this patent is extended or adjusted under 35 U.S.C. 154(b) by 565 days.

(21) Appl. No.: 13/986,255

(22) Filed: Apr. 16, 2013

(65) Prior Publication Data

US 2014/0309763 A1  Oct. 16, 2014

(51) Int. Cl.
  *G05B 15/02* (2006.01)
(52) U.S. Cl.
  CPC ..................................... *G05B 15/02* (2013.01)
(58) Field of Classification Search
  None
  See application file for complete search history.

(56) References Cited

U.S. PATENT DOCUMENTS

| | | | | |
|---|---|---|---|---|
| 2006/0273885 A1* | 12/2006 | Thompson | ............ | B60R 25/042 340/426.34 |
| 2010/0174576 A1* | 7/2010 | Naylor | ................... | G06Q 10/04 701/31.4 |
| 2012/0110511 A1* | 5/2012 | Howard | ................ | G06F 3/0488 715/835 |
| 2012/0249070 A1* | 10/2012 | Sellner | .................. | B60L 3/0069 320/109 |
| 2013/0096697 A1* | 4/2013 | Frazer | .................... | G05B 15/02 700/12 |
| 2013/0237174 A1* | 9/2013 | Gusikhin | ................ | H04W 4/22 455/404.1 |
| 2013/0317678 A1* | 11/2013 | Lieberman | .............. | G06F 17/00 701/21 |

OTHER PUBLICATIONS http://dataltd.com/dli-8300/.
http://dataltd.com/dli-8500p/.
www.psion.com/products/vehiclemount/8515.htm.
http://glaciercomputer.com.
http://glaciercomputer.com/accessories-forklift-monitoring.html.
http://www.liberty-sys.com/mobile-computers/lxe/vehicle-computers/lxe.htm.
http://www.telenav.com/tnt/include/pdfs/2012/Integration_INT%20DS%2001%20V2.0%200112.pdf.
http://images.qesmarketing.qualcomm.com/Web/QualcommQES/%7B0b93ea29-899a-495d-8f11-9d1168f3d7bf%7D_LCL1103_03-13_MCP200_Brochure.pdf.
http://www.gps-telematics.co.uk/documents/AT220_appnote_canbus_faqs.pdf.
http://www.mccdaq.com/usb-data-acquisition/USB-7000-Series.aspx.

* cited by examiner

*Primary Examiner* — Mohammad Ali
*Assistant Examiner* — Bernard G Lindsay
(74) *Attorney, Agent, or Firm* — George S. Cole, Esq.

(57) ABSTRACT

A sensor and power coordinator device fixably mounted to a piece of fixed or moveable equipment including a vehicle and capable of supporting a varying collection of computationally-potent, communication handhelds, that provisions power and coordinates metrics, authorization, and operation to enable sharing of vehicle-and-device-and-handheld-and-operator-specific data, thereby enabling aggregate operations by providing the collective operational stability while accommodating operator and handheld variation.

16 Claims, 6 Drawing Sheets

SENSOR AND POWER COORDINATOR FOR VEHICLES AND PRODUCTION LINES THAT HOSTS REMOVABLE COMPUTING AND MESSAGING DEVICES

CROSS-REFERENCES

None

GOVERNMENT RIGHTS

None

BACKGROUND OF THE INVENTION

1.A. Field of the Invention

This invention is in the field of cooperative, coordinated, operational integration of multi-device and multi-user combinations; more specifically, the field organizing a potentially varying bag of sensor-computation-messaging-and-display user devices (or 'nodal elements') with a second set of operational equipment, both moveable and fixed, to enable their use together in and as a single system; and most specifically, in the field of fixably-mounted coordinating devices which allow, support, and distinguish non-ordered, non-identical, user-and-device varying 'nodal' elements while effecting common interconnectivity and interactions, while provisioning electrical power to each connected nodal element from the more capacious source in the operational equipment.

1.B. Description of the Related Art

When people try to coordinate their interactivity they face a conflict between stability and flexibility which is particularly problematic when different, particular operators may want to work with different, particular devices. With the transition from the personal computer, even the laptop, to today's handheld computational and communication devices (cell phones, smartphones, handhelds, and tablets), this conflict has greatly intensified. At one extreme are collections of fungible, identical elements; at the other, collections whose elements are each unique to their specific functioning.

On the first hand, to the extent that the separate must interact, there must exist a commonality. What will distinguish a set of such devices from a jumbled and separably aggregable collection thereof, is the commonality of the terms of their interconnectivity which link only those members, and none others, together—the commonality being any combination of such subordinate necessary but non-sufficient aspects such as a common language, protocol, ownership authorization, or physically-enabling proximity or other like defining connectivity. (All humans may not speak the same language, but we form operative linguistic sets for each separate language; all devices that use CDMA form one set, as do all devices that use Bluetooth. Just as with humans, devices can belong to more than one 'see'.)

On the other hand, beyond the limits of required interactivity, additional differentiation will allow particular members to meet distinct functional needs and pressures. One user may require the larger display of a tablet, while a second may require the greater carrying ease of a smartphone—yet both may wish to interact as to the placement and movement of a particular pallet of goods, within the same distribution center. Just as both left and right hands have five digits with thumbs pointing 'inward' when at rest—but the left thumb points right, and the right thumb, left—yet both hands may be used to move an object too heavy for a single arm's strength.

Commonality and differentiation have complementary problems; and the range of variation can extend from having fungible devices (each entirely identical to all other units in the set) to entirely unique devices (each particular to one specific operator/location/function). The more common individual members of a set are, the less organization is needed during operational use; but the more restricted will be the potential variations (if everyone has to carry the same tablet, its specifications will limit what any one can do). The more varied individual members of a set are, the more organization is needed during operational use (to avoid sending a device/operator to do a task which that particular device is not configured for); but the less restricted will be the potential variations (many more tasks may be attainable across the entire collection by sending out those device/operator pairings uniquely suited to the task constraints).

The complexity and cost of managing an organized collection is generally reciprocally related to the complexity and cost of changing it. A more uniform collection is simpler to manage, but more difficult and costlier to change (since everything which is uniform must be changed together). In contrast a more diverse collection, while more difficult to manage (since substitutions, or other changes, must be tailored), generally is easier and cheaper to change (since adaptations already present can be reordered or else can be handled piecemeal). Going from English to metric measurements in a shipping operation which has only handled the first, is much harder and more expensive than doing the same for an international shipping operation already accustomed to dual measurements.

Two general classes of organized collections are vehicle-based transportation operations, and manufactory operations. The first may incorporate any or all of humans (porters, stockers, stevedores, whether with or without hand tools or unpowered, dumb, trolleys), and any set of operational equipment such as forklifts, flatbeds (with or without tractor elements), conveyers, cranes, and the separable 'planes, trains and automobiles'—all working with and in sourcing, warehousing, and destination locations. The second may incorporate a set of production lines, each comprising both operational equipment (individual machine tools with transformational and sensory capabilities) and human operators, where sub-steps of transformative operations (shaping, fitting, joining, finishing, packaging, and labeling) turn the production line's source inputs into a flow of finished goods or completed orders.

The prior art has principally focused on an enforced uniformity and 'top-down' or 'command-oriented' infrastructures, that is, organizations which demanded uniformity and fungibility of the machinery and operators. While suitable for mass production and bulk transportation, it imposes a high and fixed overhead (in identicality of machinery, training, process flows, ownership, and controls). It also constrained or eliminated (as unprofitably complex and costly) flexibility and adaptivity.

Additionally, the prior art focused on employer-provided and uniform collections because the producers and suppliers of these liked getting customers 'locked-in', as this lowered the cost to the producers and suppliers of on-going adaptation to diversity and created a greater barrier to competitive entry, the larger the cooperative organization became.

One of the chief problems with the prior art was the assumption that all aspects of the commonality had to be identical in their presumption of an operative hierarchy, particularly as this seemed to match the existing 'standard' for communication, computational, and electrical power provisioning and control. There is a presumption that there is a centralizing, dominant, element which commands and controls all three of these functions, however much it may delegate the operative minutia to 'subordinate' elements.

This also matches the very human, and most common social assumptions, about coordinated operations—that they require a hierarchy of leaders and supporters. Yet the reality is that both devices and humans, inasmuch as they have different capabilities, can often devise—particularly on an ad-hoc, varying basis—more effective interoperative groupings by sharing and coordinating the 'leadership' according to the relative strengths and demands upon the individual members; that there are times when for each of several different functions (computation, communication, power provisioning) the best and most effective organization could see three disparate 'leaders'—particularly so, if the collection is one of heterogeneous units with differing capabilities.

Presumptive Uniformity in the Prior Art

Examples of the prior art include one line of products focusing on the 'stand-alone' or 'nodal' approach to interoperative devices, namely, the computational-display-and-communicating devices that each human user will interact with. One such is the DLI 8300 'Rugged Tablet' (http://dataltd.com/dli-8300/) and the DLI 8500P 'Vehicle mount terminal' (http://dataltd.com/dli-8500p/); both being simply a 'Wintel' tablet computer with communications links, and each having an internal battery which limits fully active use to substantially less than a full shift (an estimated 4 hours for the 8300; an estimated 1.5 hours for the 8500P). A third, like example is the Psion 8500 (www.psion.com/products/vehiclemount/8515.htm); again, a discrete 'nodal' device without either a shared 'backbone' or 'nervous system' (hardware or software). A fourth and fifth such are Glacier Computer's tablet computer line, and the forklift monitoring device (http://glaciercomputer.com; . . . /accessories-forklift-monitoring.html)—separate and unintegrated. Several more variations are offered by Liberty Systems (e.g., http://www.liberty-sys.com/mobile-computers/lxe/vehicle-computers/lxe.htm).

Another line of products focused on hardware which provide a basic functionality of vehicle tracking (locational rather than proscriptive, i.e. not 'driving' the vehicle), and that chiefly as part of 'fleet management', such as those comprising TeleNav's Vehicle Tracker™ (http://glaciercomputer.com/accessories-forklift-monitoring.html), which contain antennae and a 'battery line', but require a third-party (Telenav) hosting computer and service plan to provide a 'back-office' functionality (see, (http://www.telenay.com/tnt/include/pdfs/2012/Integration_INT%20DS%2001%20V2.0%200112.pdf). A second such example is the 'Mobile Computing Platform' offered by a Qualcomm subsidiary, Omnitracs, as can be seen at: (http://images.qesmarketing.qualcomm.com/Web/QualcommQES/%7B0b93ea29-899a-495d-8f11-9d1168f3d7bf%7D_LCL1103_03-13MCP200_Brochure.pdf).

A third line of products are designed solely for remote reporting, e.g.: http://www.gps-telematics.co.uk/documents/AT220_appnote_canbus_faqs.pdf; or, http://www.mccdaq.com/usb-data-acquisition/USB-7000-Series.aspx.

The principle problem with the prior art is that the solution sets are intended to be 'unitary'—that is, all coming from the same provider and with each particular device being fungibly identical across the multiple vehicles and for the individual operators or users. That of course is preferred by the providers, who get customers who become locked in to that provider's solution; but that total commitment is both off-putting and disliked by potential users who prefer flexibility in commitment, cost, and computational/communication approaches. It also requires that there be a single, central, and prescriptive determination of what 'nodal' device set can and must be used—which ignores the reality of both modern living (namely, the growing ubiquity of personal, i.e. individually-owned, tablet computers, cell phones and smartphones) and the reasonable economics of a shared yet interoperable network.

Suppose, however, that there were human, and organizational, reasons to prefer more variation and flexibility? Suppose one wanted to build up interoperability piecemeal? Or to use and test different handhelds for their different virtues (or weaknesses)? Or suppose the development of handhelds, and vehicle-embeddable devices, is happening with a shorter cycle time than can be used to depreciate an entire operation's installation? Or suppose that differing human operators wanted to use differing devices—including their own? Suppose differing groups sought to establish interoperability for short-term rather than a permanent basis? Might there be a need for a way to effect like interoperability which presumed the use of heterogeneous, or at least varying, handhelds? That is what the present invention provides, meeting needs and solutions to problems and questions which the prior art at best ignored and generally considered entirely undesirable and unworkable complications.

SUMMARY OF THE INVENTION

The present invention is for a fixably mounted Sensor and Power Coordinator ('SPC') (in the preferred embodiment, fixably mounted to a specific vehicle) providing an interoperative, supportive commonality yet directly used by a human operator only through a nodal device ('ND') connected with the SPC. The vehicle will have at least one sensor (or multiple sensors) for data relating to any set of the vehicle's condition, operational state, and external environment. A ND is any of a varying set of handheld computational-and-communication devices (cell phones, smartphones, handhelds, and tablets) which provide the operator with that ND's display, interactive input and output, embedded software and controls and communication link(s). The SPC is both coordinating computational and communication data display and control from, and data reporting to, an external nodal device, and provisioning electrical power from said vehicle's internal power source to said external nodal device. Thus the SPC provides power from and data from or about any sensor(s) or operable element(s), or current state(s) of the vehicle, or equipment, to which it is fixed, to the ND. The ND communicates such data to the operator or through its communication link(s) to a remote computer(s), and communicates commands from the operator or remote computer(s) to the SPC to effect control over the sensor(s) or operable element(s), or current state(s) of the vehicle.

A BRIEF DESCRIPTION OF THE SEVERAL VIEWS OF THE DRAWINGS

DETAILED DESCRIPTION OF THE DRAWINGS

Figure 1:
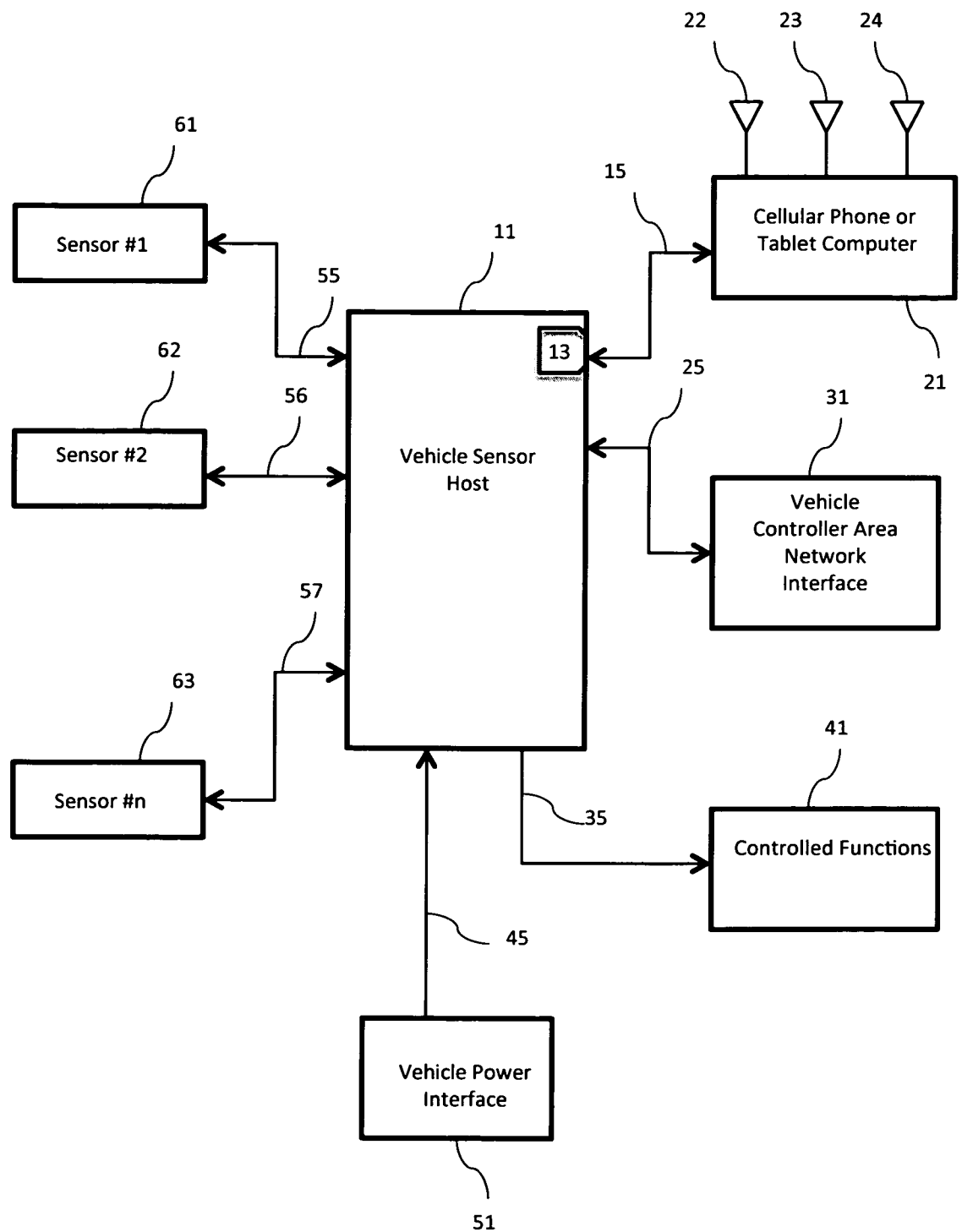
FIG. 1 is an overview of a Sensor and Power Coordinator with its power, communication, and operational connections.

FIG. 1: A Sensor and Power Coordinator ('SPC') 11 is meant to be fixedly, even permanently, attached to a vehicle such as a truck, forklift, container-handling crane, or other moving vehicle. The SPC 11 comprises both a main processor and means for power provisioning connected with and controlled by said main processor and connected with and provisioning power for and to said external nodal device when said external nodal device is connected with said SPC, receives electrical power through a Vehicle Power Interface ('VPI') 51 using a power link 45, with said power originating from the vehicle's power source(s) (i.e. whichever is active of a standard battery, alternator, generator), thus comprising means for power provisioning connected with and controlled by said main processor and connected with and provisioning power for and to said external nodal device when said external nodal device is connected with said SPC. In the preferred embodiment the VPI 51 comprises means to handle (i.e. receive, use, and distribute) a ranged set of vehicle power source levels including but not limited to, 12V and 24 VDC and of differing levels of 'clean' nature by balancing out any of the set of surges, phase irregularities, and drops in current flow which if not corrected can damaging more delicate electrical circuitry.

The Sensor and Power Coordinator 11 is able to support a set of sensors each member of which is a sensor capable of being used on a mobile vehicle. The set of potential sensors 61, 62 and 63 comprise but are not limited to: sensors for measuring any of temperature, pressure, distance, position, contact or latch state(s) (open, closed, locked); counters, barcode scanners, passcode signalers; compasses, gyroscopes, lasers, rangefinders (optical, laser, sonar, radar, or any combination thereof); and camera and imaging devices. The Sensor and Power Coordinator 11 is able to provide from the VPI 51 power to each individual sensor through a link capable of both power and data transmission (respectively, 55, 56 and 57); and at least one sensor (61, 62, 63, or any combination) will be connected with the SPC 11. These SPC-controlled and current-limited power and data links 55, 56 and 57 are designed to cover the greatest range of possible sensors. The electrical power provided over 55, 56 and 57 is intended to be suitable for various sensors, but is generally different (in amplitude, frequency, or both) from either vehicle or SPC 11 electrical power. In the preferred embodiment the sensor signals sent from any of the individual sensors 61, 62 and 63 over the power and data links 55, 56 and 57 to the SPC 11, and the sensor control signals reciprocally sent over each same link from the SPC 11, may be a mixture of analog or digital signals; and the Sensor and Power Coordinator 11 will support a variety of possible signal inputs.

The Sensor and Power Coordinator 11 is specifically designed without any inherent user display. It supports at least one USB Charging Downstream Port Interface ('USB-CDPI') 13 to connect through a distinct power and data link 15 with a Nodal Device ('ND') 21 which in the preferred embodiment comprises any of the set of Cellular Phones, Smartphones, or Tablet Computers. This USBCDPI 13 in the preferred embodiment can allow at least one ND 21 to be used and operated continually while connected with the SPC 11 without needing to be removed and recharged because that ND 21 battery became exhausted, as the power and data link 15 supports both power and data transmission between the SPC 11 and ND 21, and the VPI 51 will provide the necessary electrical power from the vehicle's power source(s) to the ND 21. A typical ND 21 will have multiple antennas and communication links as shown by 22, 23, and 24. These communication links 22, 23, and 24 may include, but are not limited to, Wireless LAN, Bluetooth, Cellular Networking, and GPS Receivers.

In the preferred embodiment the SPC 11 also incorporates a Real-Time Clock 104 connected with the main processor, which tracks the current time and date for the SPC 11. The Real-Time Clock 104 is used to 'time-stamp' data from any of the sensors (61, 62, 63), which is then stored in the SPC's memory.

As shown in FIG. 1, the operator of the vehicle in which the Sensor and Power Coordinator 11 is mounted, is able to use and share the computational, communication capabilities of the ND 21 while using the sensors and electrical power resources of the vehicle. Software running on the ND 21 is able to receive sensor readings from any of the communicating sensors (61, 62, 63) (current, or stored in the memory when the ND 11 was not attached) through the Sensor and Power Coordinator 11 and transmit them to a remote computer system (not shown). The operator can use any of the ND 21 software to send control signals to the Sensor and Power Coordinator 11. This can include setting the time of the SPC's Real Time Clock 104. In the preferred embodiment the SPC 11 further comprises means for detecting and operating a subset of devices of the vehicle affecting its operation(s), condition(s) and state(s) ('Controlled Functions'); so the Sensor and Power Coordinator 11 is able to send signals via a data and control link 35 to a set of the various Controlled Functions 41 of the vehicle in which it is mounted, and thus to operate any set of the vehicle's systems and equipment. Controlled Functions 41 could include, but are not limited to, activating relays; operating any set of the sensors (61, 62, 63); turning on or off any or all of the vehicle's lights; powering on equipment; any of opening, closing, locking or unlocking latches; setting, triggering, or silencing vehicle alarms; and capturing an image at a specific time, angle, or distance.

Many newer vehicles use a Vehicle Controller Area Network (not shown) throughout the vehicle. In a further embodiment the Sensor and Power Coordinator 11 is designed to interface with one such through a data link 25 connected to an included Vehicle Controller Area Network Interface 31, if that vehicle has a Vehicle Controller Area Network and such operation is desired. This capability can allow the SPC 11 to monitor various functions of the vehicle including, but not limited to, oil pressure, coolant temperature, tire pressure, distance traveled, vehicle speed, and wheel revolution counts. While these are all regularly read and analyzed on a vehicle, or by a diagnostic tool, this capability of the SPC 11 allows the data to be analyzed in real-time and transmitted through a ND 21 to any set off-vehicle services and computers of perhaps greater, or more appropriate processing power, including even a mainframe or supercomputer. Through the ND 21 may be returned specific operational constraints or commands which, through the Controlled Functions 41, the SPC 11 can effect, thereby preventing degradation or even damage to the vehicle until maintenance can be done.

Figure 2:
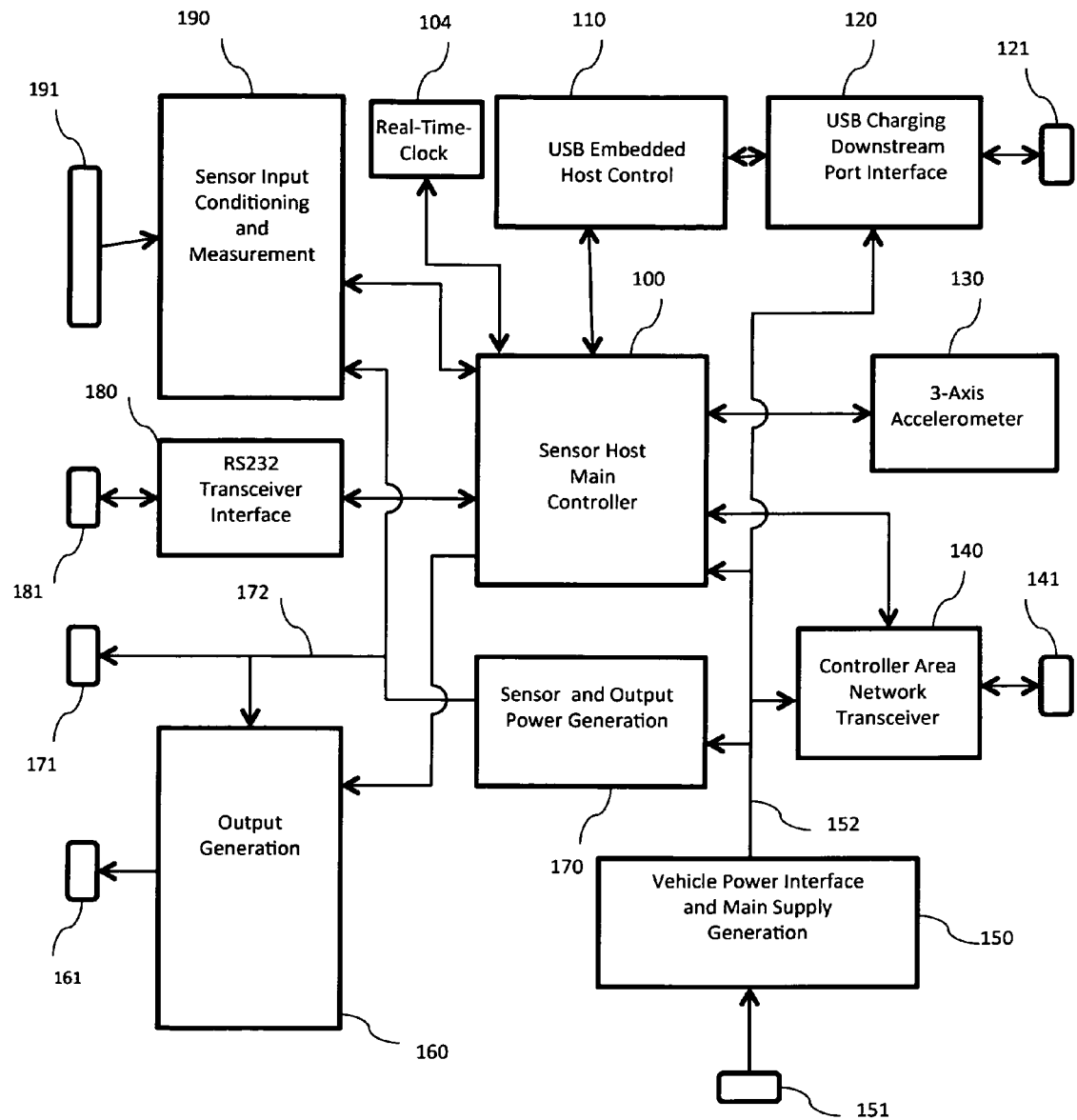
FIG. 2 is a functional block diagram of the Sensor and Power Coordinator and its power, communication, and operational connections.

FIG. 2 shows the preferred embodiment of the Sensor and Power Coordinator 11 with more specific detail as to its functional blocks. Central control for the SPC 11 is handled by a Sensor Host Main Controller 100 which comprises a main processor to which is connected memory, which is responsible for all communication tasks, sensor reading, output control, and interfaces—subject to USB communication and control functionalities over data, which as was shown in FIG. 1 are communicated through the USBCDPI 13.

(The details of the main processor and memory for the Sensor Host Main Controller are not shown, as linking memory with a processor is standard in the existing art.)

Typically the USB Host function is done by the most capable and powerful computing platform in a system—where 'powerful' denotes the measurement of computational capability and/or memory, as distinct from electrical power transmission, generation, or storage capacity. Typically, also, the USB Host function includes providing electrical power to each connected device.

The present invention, however, recognizes that while as shown in FIG. 1 the most powerful computing platform will generally be the ND 21 and not the SPC 11, the relative measure is reversed when 'powerful' denotes electrical power transmission, generation, or storage capacity. If the ND 21 served as the USB Host for electrical power, then it would run down its battery and require recharging (very rapidly if trying to drive a vehicle's electrical system!). In the present invention the ND 21, while otherwise acting as the USB Host for data communication and control, hands that role as to electrical power over to the SPC 11, which accesses, manages, and shares any combination of vehicle power generation and/or greater battery capacity of the vehicle on which the SPC is mounted, instead of drawing electrical power from, and ceding control over electrical power provisioning to, the ND 21.

To have the ability to power a ND 21 directly and to provide means for USB interoperability it is necessary for the Sensor and Power Coordinator 11 to be a USB Host; accordingly, the USBCDPI 13 further comprises and provides at least a USB Embedded Host controller, the USB Embedded Host Control 110, connecting the Sensor Host Main Controller 100 with a USB Charging Downstream Port Interface 120. The USBCDPI 120 is also connected with the Vehicle Power Interface and Main Supply Generation 150 which serves as the source for the power for all of the SPC 11, ND 21, sensors 61, 62, 63 and secondary elements respectively thereof.

A standard USB Host is able to provide 500 mA of current to an attached USB device. For the Sensor and Power Coordinator 11 and its ND 21, this amount of electrical power would not be sufficient to operate many NDs for extended periods of time (or the vehicle at all). To surpass this hurdle, the Sensor and Power Coordinator 11 implements a USB Charging Downstream Port Interface 120. Standard USB chargers may charge devices at higher current levels than 500 mA, but do so without any data communication. The USB Charging Downstream Port Interface 120 not only allows charging the ND 21 at up to 1.5 Amps (three times the standard capacity), but also enables and permits simultaneous communication over the USB interface simultaneously. The USB Charging Downstream Port Interface 120 connects the SPC 11 with the ND 21 with at least one USB physical connector 121. While this is more complex to implement than simple USB Device capability, it allows the Sensor and Power Coordinator 11 to simultaneously communicate, power and charge any attached ND 21.

The Sensor Host Main Controller 100 in the preferred embodiment is further connected with a 3-Axis Accelerometer 130. This element principally determines the orientation of the Sensor and Power Coordinator 11 in the vehicle in which it is mounted. Typically, the Sensor and Power Coordinator 11 will be fixedly mounted to a specific vehicle. When the vehicle is moving, or being moved, the 3-Axis Accelerometer 130 can be used to determine the orientation of the Sensor and Power Coordinator 11 in the vehicle and thus the geopositioning and orientation of the vehicle itself. While the ND 21 may have any or all of gyroscope, accelerometer and compass elements and/or geo-positioning information that would be useful to a positioning system, unfortunately, without knowing the relative orientations of both the ND 21 and the vehicle on which the SPC 11 is mounted, such would be of limited use and accuracy. However, by combining the geo-positioning information from both ND 21 and SPC 11, a fully integrated positioning determination can be made, not just to determine the orientation of the ND 21 within the vehicle but also, as with the best integrated positioning systems which use both GPS and Inertial Navigation signals, to improve the accuracy of determination of precisely where the vehicle is, including specifics of its orientation and position.

The 3-Axis Accelerometer 130 helps to make such additional information possible. An additional novel feature obtained through incorporation of the 3-Axis Accelerometer 130 is the ability to detect vehicle vibration and shaking. This information can be used to determine when the vehicle's power generation element (not shown) has shutdown, and use that as a control signal to transition the SPC 11, and the ND 21, and any other connected elements, to low power operation so as not to drain the vehicle's battery. To allow this information to be used, the 3-Axis Accelerometer 130 is connected with the Sensor Host Main Controller 100.

The Sensor Host Main Controller 100 in the preferred embodiment is further connected with a Controller Area Network Transceiver 140 which is used to communicate with the vehicle internal databus through the connection port 141 to obtain status information of interest.

The Vehicle Power Interface and Main Supply Generation 150 connecting both with the Sensor Host Main Controller 100 and the USB Charging Downstream Port Interface 120, not only provides the means to power the SPC 11, ND 21, and sensors 61, 62, 63, but also comprises standard elements to handle variable voltage levels for different types of vehicles as well as protective elements against harsh overvoltage conditions that can occur. The power output of the Vehicle Power Interface and Main Supply Generation 150 supplies 'clean' power (that adjusted to the much more tightly constrained limits of computational electrical subcomponents, than found or used by many vehicle ignition or lighting systems) to the Sensor Host Main Controller 100, the USB Bus 121 through the USB Charging Downstream Port Interface 120, the Controller Area Network Transceiver Interface 140, and the Sensor and Output Power Generation 170, which then adjusts the electrical power to voltage levels that are suited to sensors 172 and control signals in the overall system.

The SPC 11 in the preferred embodiment further comprises means for generating, modulating, and reading digital signals, including control signals and means for modulating and sending Pulse Width Modulated analog signals. The Sensor Host Main Controller 100 connects with the at least one sensor through its connection with a Sensor Input Conditioning and Measurement element 190 ('Sensor Input Conditioning and Measurement') which itself has a connection 191 to the at least one sensor for data relating to any set of the vehicle's condition, operational state, and external environment, with the Sensor Input Conditioning and Measurement 190 reporting data to and receiving control from said Sensor Host Main Controller 100.

The SPC 11 in the preferred embodiment further comprises an Output Generation element 160 ('Output Generation') connected to and reporting data to and receiving control from said Sensor Host Main Controller 100, and connected to and receiving power from a Sensor and Output Power Generation element 170 ('Sensor and Output Power Generation'), which itself is also connected with both said Vehicle Power Interface and Main Supply Generation element 152 ('Vehicle Power Interface and Main Supply Generation') and also to said Sensor Input Conditioning and Measurement 190.

The Output Generation 160 supports both digital control signals and Pulse Width Modulated control signals. Pulse Width Modulation permits various capabilities including generation of Analog signals with appropriate filtering and dimming of lights. Also in the preferred embodiment the Sensor Host Main Controller 100 is connected with a RS232 Transceiver Interface 180 which is provided to communicate to more complex sensors systems that might have many inputs, or have only an RS232 interface. The Sensor Input Conditioning and Measurement 190 includes protecting against overvoltage and over-current conditions that might occur in a vehicle. Signals must be scaled for reading by the Sensor Host Main Controller 100 where they are read and transmitted to the ND 21.

To allow data from any of sensors 61, 62, 63, the Vehicle Controller Area Network Interface 31, or the 3-Axis Accelerometer 130, to be given temporal context, in the preferred embodiment a Real-Time-Clock 104 is connected with and controlled by the Sensor Host Main Controller 100. This allows the Sensor Host Main Controller 100 to take and store data from any or all of these inputs while no external nodal device is connected, and later, upon connection with an external nodal device, report the stored data to the now-connected external nodal device in a 'black box' function.

Figure 3:
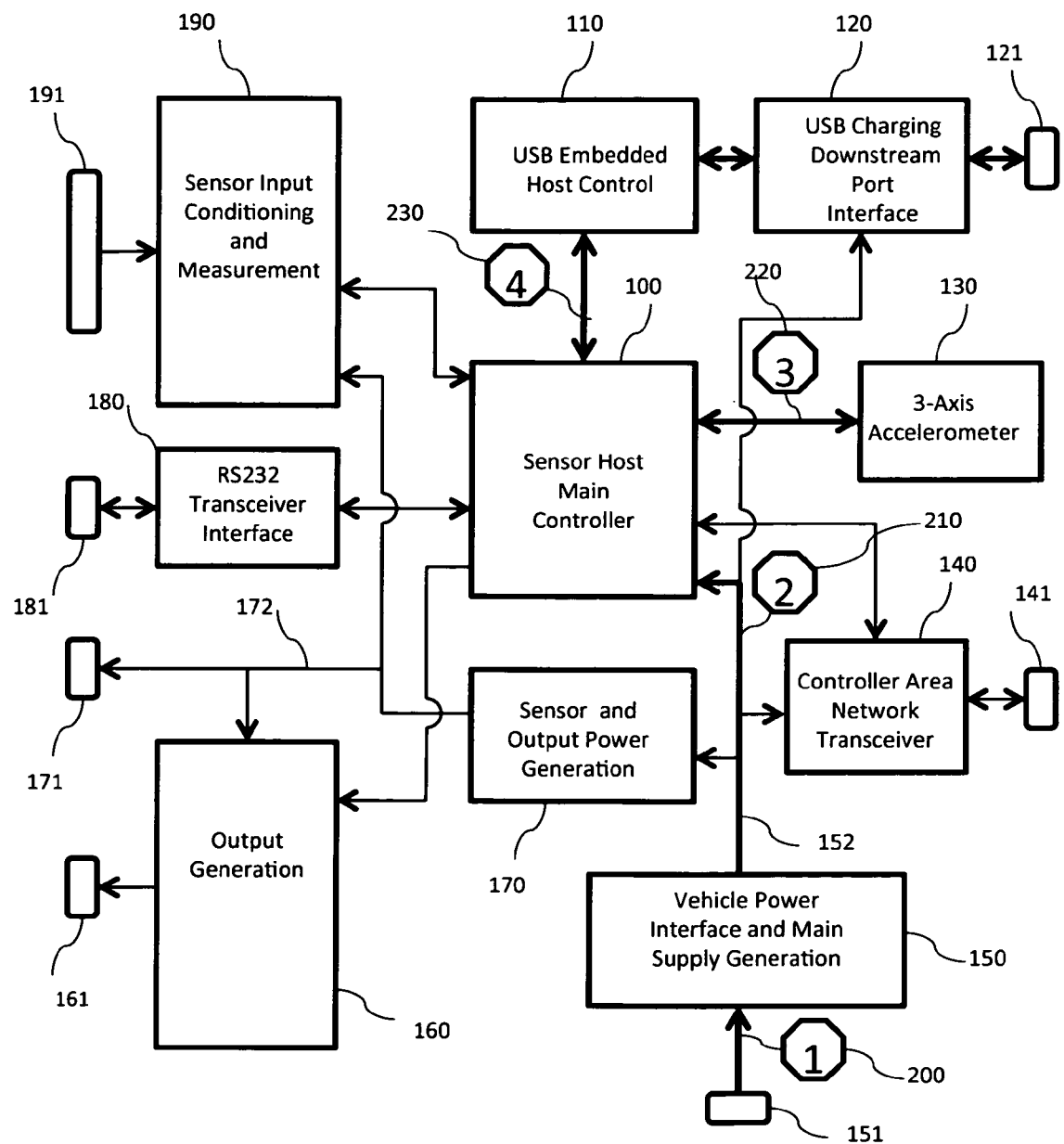
FIG. 3 is the functional block diagram of the Sensor and Power Coordinator with the power-up Initialization Sequence detailed.

FIG. 3 shows the power-up sequence within and for the Sensor and Power Coordinator 11, as well as differentiating central and peripheral functional elements therein. The first step in the power-up sequence 200 is for vehicle power to be applied to connector 151. The Vehicle Power Interface and Main Supply Generation 150 starts to build up the system power. When the system power 152 reaches its designated level 210, the Sensor Host Main Controller 100 will start up. The third step is for the Sensor Host Main Controller 100 to power up and activate the 3-Axis Accelerometer 130. The fourth step is for the Sensor Host Main Controller 100 to power up and activate the USB Embedded Host Controller 110 and to begin checking for a live USB Connection; if a ND 21 is already attached to the Sensor and Power Coordinator 11, then the system will cycle through the steps described below in FIG. 4 to determine the power to output on the USB connector 121. Connectors and blocks 140, 141, 160, 161, 170, 171, 172, 180, 181, 190, and 191 are all optional, and the determination as to whether they should be enabled or powered on is based upon the content of the control messages sent to the Sensor and Power Coordinator 11 from the ND 21. When the SPC 11 and ND 21 are in full operation mode, sensor data from any sensor 61, 62 and 63 that has been configured is transmitted to the ND 21. Control signals from a remote computer that have been configured can be sent from or through the ND 21 to the Output Generation 160. In addition, RS232 messages can be sent and received through connector 181. Controller Area Network messaging is done through connector 141. 3-Axis Accelerometer 130 data that is generated in the Sensor and Power Coordinator 11 can be processed and passed up to the ND 21.

Figure 4:
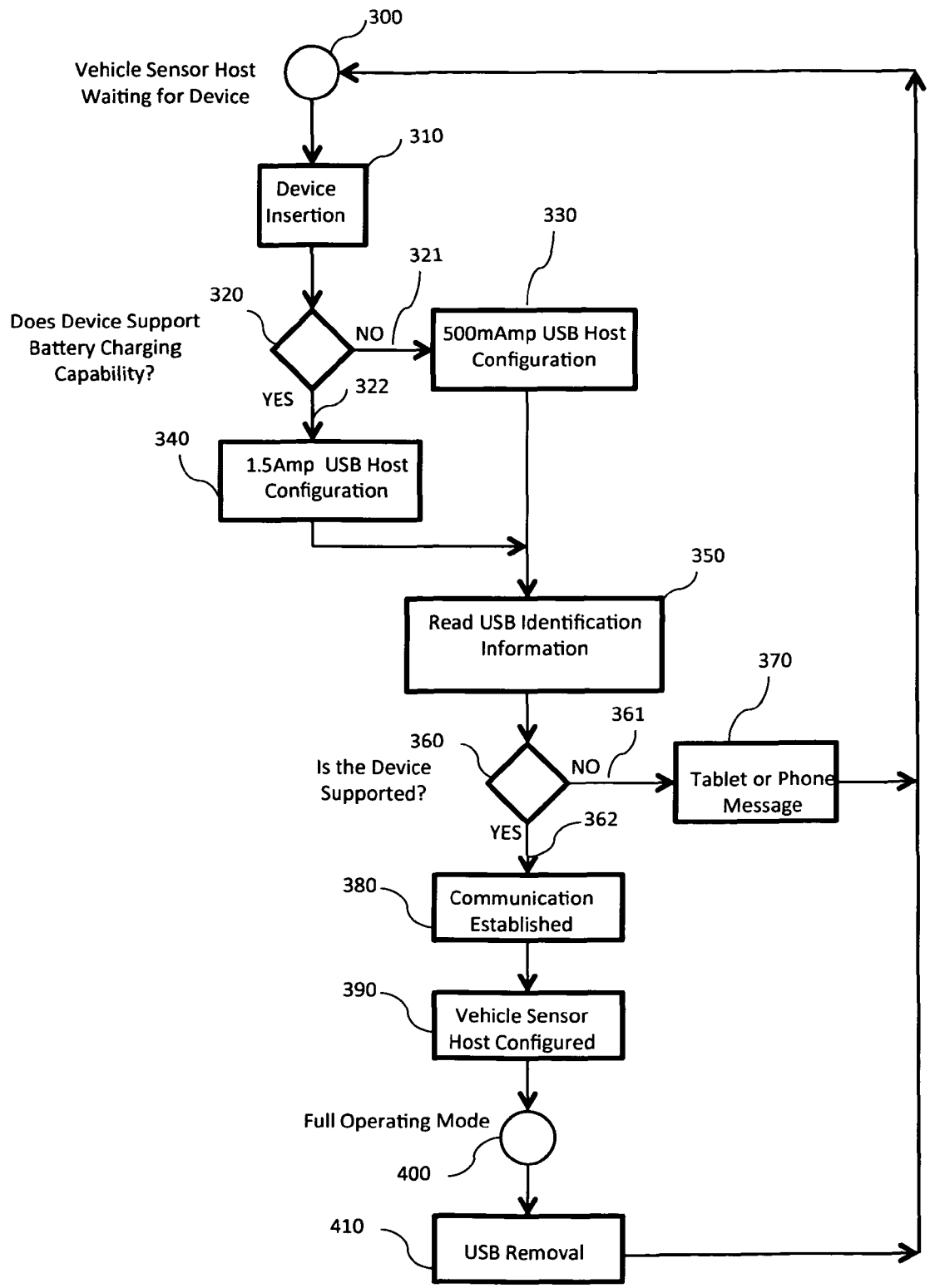
FIG. 4 is the flowchart for the logic of the Sensor and Power Coordinator both for a Nodal Device's USB Insertion and for non-inserted operation.

FIG. 4 shows the Insertion Logic Flow for when a USB Device (a ND 21) is connected with the SPC 11. When the Sensor and Power Coordinator 11 is powered on, it checks for and as necessary waits for the attachment of a Node Device 21 as shown in 300. When a ND 21 is inserted into connector 121, this is detected by block 310. The check in block 320 is used to determine whether the inserted ND 21 is a USB Device which supports Battery Charging Capability. If this is true and the ND 21 supports Battery Charging Capability, then the insertion logic follows branch 322 to the 1.5 Amp USB Host Configuration 340 state. If false and the ND 21 does not support Battery Charging Capability, then the insertion logic moves along branch 321 to the 500 mA USB Host Configuration 330 state. The SPC 11 can work for both branches 321 and 322, but a 'switch' signal informs the SPC 11 which is appropriate for the inserted ND 21.

The insertion logic next moves to the Read USB Identification Information 350 state. At this point, the SPC 11 checks 360 whether the attached ND 21 is supported by the USB Embedded Host Control 110. If the device is not supported, branch 361 is taken, a message 370 is displayed on the inserted ND 21 for its user to that effect, and the system returns to the Sensor Host Waiting for Device state 300. If the device is supported, branch 362 is taken.

Branch 362 leads to state 380 where a sequence of steps (not shown as reasonably known to the art) are taken to set up bi-directional communication between the SPC 11 and the ND 21. In the preferred embodiment these steps will include authentication and validation of the operator and establishment of the tasks and capabilities which the ND 21 can effect through the SPC 11.

Once communication is established, the SPC 11 can check to determine whether it needs to perform a software upgrade by communicating back to a remote computer system (not shown) using the communication link of the ND 21. In state Sensor and Power Coordinator Configured 390, the SPC 11 also sets up the Sensor Input Conditioning and Measurement 190, the RS232 Transceiver Interface 180, the Output Generation 160, the Sensor and Output Power Generation 170, and the Controller Area Network Transceiver 140, if they are present to be connected.

Once the Sensor and Power Coordinator Configured 390 state is completed, the system transitions to Full Operating Mode 400.

If the ND 21 is removed, the system processes this action in USB Removal 410, and then transitions to Sensor and Power Coordinator Waiting for Device 300.

Figure 5:
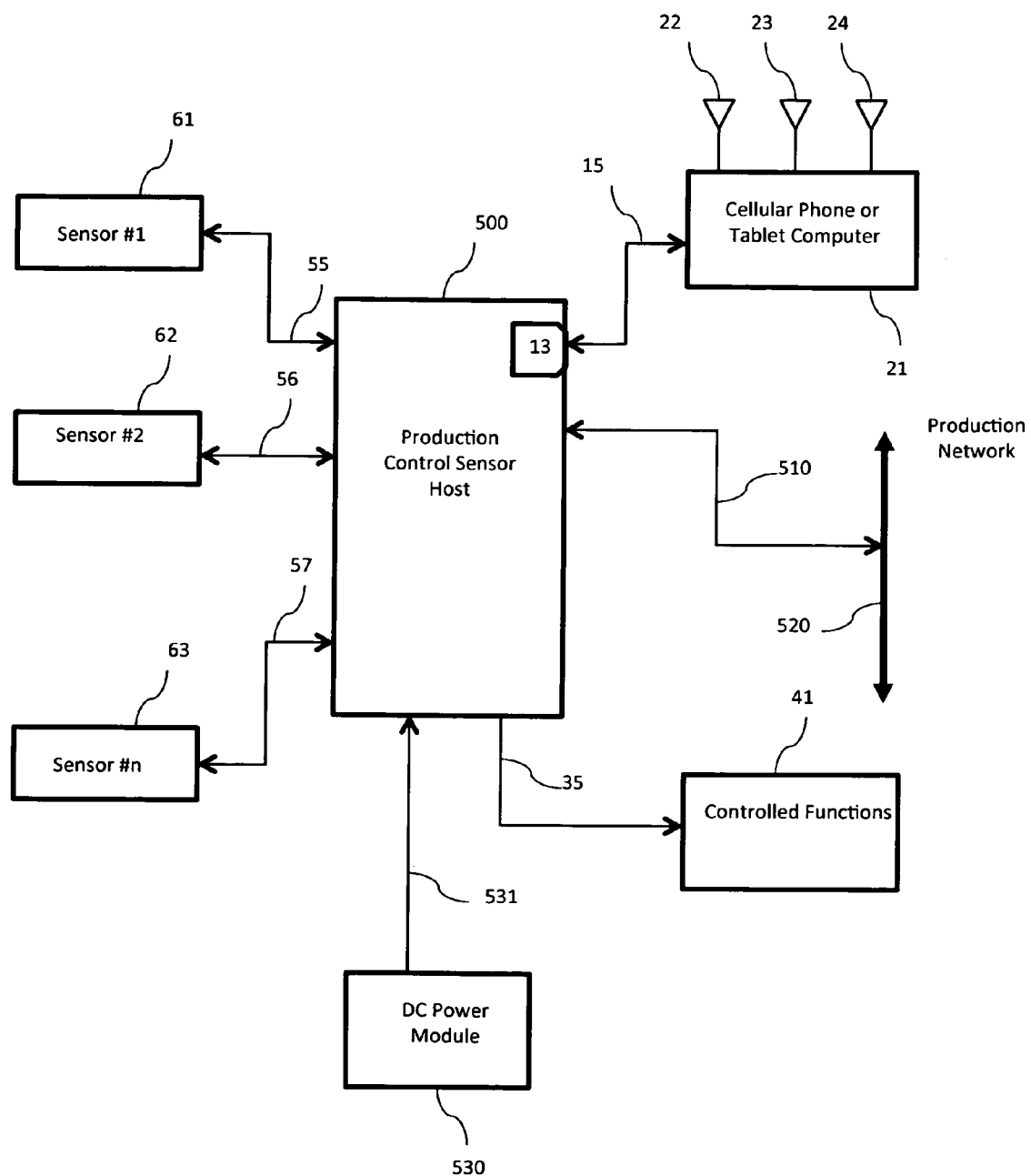
FIG. 5 is an overview of a Sensor and Power Coordinator for a Production Control element.

FIG. 5: A Production Control Coordinator ('PPC') 500 is meant to be fixedly, even permanently, attached to a fixed-point station in a production line which fixed-point station comprises both machinery and at least one associated sensor that will effect a transformational operation upon a physical input. The PPC 500 is connected with a DC Power Module 530 which both powers the PPC 500 and is used by the PPC 500 through its USB Charging Downstream Port Interface ('USBCDPI') 513 to connect through a distinct power and data link 15 with a Nodal Device ('ND') 21 which in the preferred embodiment comprises any of the set of Cellular Phones, Smartphones, or Tablet Computers. The DC Power Module 530 comprises means to handle (i.e. receive, use, and distribute) a ranged set of power source levels including but not limited to, 12V and 24 VDC and of differing levels of 'clean' nature (surges, phase irregularities, and drops are balanced out to avoid damaging more delicate electrical circuitry).

The Production Control Coordinator 500 is able to support a set of sensors each member of which is a sensor capable of being used on that fixed-point station. The set of potential sensors 61, 62 and 63 comprise but are not limited to: sensors for measuring any of temperature, pressure, distance, position, contact or contact state(s) (clear, attached, locked); counters, barcode scanners, passcode signalers; compasses, gyroscopes, lasers, rangefinders (optical, laser, sonar, radar, or any combination thereof); camera and imaging devices; and temperature, chemical composition, pressure, or motion detectors.

The Production Control Coordinator 500 is able to provide from the DC Power Module 530 power to each individual sensor through a link capable of both power and data transmission (respectively, 55, 56 and 57); and at least one sensor (61, 62, 63, or any combination) will be connected with the PPC 500. These PPC-controlled and current-limited power and data links 55, 56 and 57 are designed to cover the greatest range of possible sensors. The electrical power provided over 55, 56 and 57 is intended to be suitable for various sensors, but is generally different (in amplitude, frequency, or both) from either standard DC or PPC 500 electrical power. In the preferred embodiment the sensor signals sent from any of the individual sensors 61, 62 and 63 over the power and data links 55, 56 and 57 to the PPC 500, and the sensor control signals reciprocally sent over each same link from the PPC 500, may be a mixture of analog or digital signals; and the Production Control Coordinator 500 will support a variety of possible signal inputs.

The Production Control Coordinator 500 is specifically designed without any inherent user display. It supports at least one USB Charging Downstream Port Interface ('USB-CDPI') 13 to connect through a distinct power and data link 15 with a Nodal Device ('ND') 21 which in the preferred embodiment comprises any of the set of Cellular Phones, Smartphones, or Tablet Computers. This USBCDPI 13 in the preferred embodiment can allow at least one ND 21 to be used and operated continually while connected with the PPC 500 without needing to be removed and recharged because that ND 21 battery became exhausted, as the power and data link 15 supports both power and data transmission between the PPC 500 and DC Power Module 530, and the ND 21, and the DC Power Module 530 will provide the necessary electrical power from the vehicle's power source(s) to the ND 21. A typical ND 21 will have multiple antennas and communication links as shown by 22, 23, and 24. These communication links 22, 23, and 24 may include, but are not limited to, Wireless LAN, Bluetooth, Cellular Networking, and GPS Receivers.

As shown in FIG. 5, the operator of the fixed-point station in which the Production Control Coordinator 500 is fixably attached, is able to use and share the computational, communication capabilities of the ND 21 while using the sensor(s) and machinery of the fixed-point station. Software running on the ND 21 is able to receive sensor readings from any of the communicating sensors (61, 62, 63) (current, or stored in the memory when the ND 21 was not attached) through the Production Control Coordinator 500 and transmit them to a remote computer system (not shown). The operator can use any of the ND 21 software to send control signals to the Production Control Coordinator 500. The Production Control Coordinator 500 is then able to send signals via a data and control link 35 to a set of the various Controlled Functions 41 of the fixed-point station to which it is fixably attached, and thus to operate any set of the fixed-point station's machinery and sensor(s). Controlled Functions 41 could include, but are not limited to, activating relays; operating any set of the sensors (61, 62, 63); turning on or off any or all of the fixed-point station's machinery; any of opening, closing, locking or unlocking latches; setting, triggering, or silencing alarms; and capturing an image at a specific time, angle, or distance.

Additionally the PCC 500 is connected through a network link 510 with a Production Network, which may connect in turn with at least one other fixed-point station or a remote computer (not shown). This capability can allow the PPC 500 to be integrated into a cooperating production environment where multiple operations and transformations upon the same physical input; so a first PPC 500 on a first fixed-point station could be welding a join at one end of an airplane wing while a second PPC 500 on a second fixed-point station could be drilling holes through a successive series of transverse struts within the wing while a third PPC 500 on a third fixed-point station could be cooling and then threading electrical wiring through already-drilled holes in the same series of transverse struts within the wing, with each of the first, second and third fixed-point stations, through their respective PPC 500, being coordinated and controlled through the respective PPC's network link 510 with the Production Network.

While the sensors (61, 62, 63) are all regularly read and analyzed through the PPC 500 these readings may be viewed in real-time by the fixed-point station's operator on the ND 21's display and transmitted through a ND 21 to any set off-Network services and computers of perhaps greater, or more appropriate processing power, including even a mainframe or supercomputer. Through the ND 21 may be returned specific operational constraints or commands which, through the Controlled Functions 41, the PPC 500 can effect, thereby preventing degradation or even damage to the fixed-point station until maintenance or resupply or even replenishment of a lacking physical input can be done.

Figure 6:
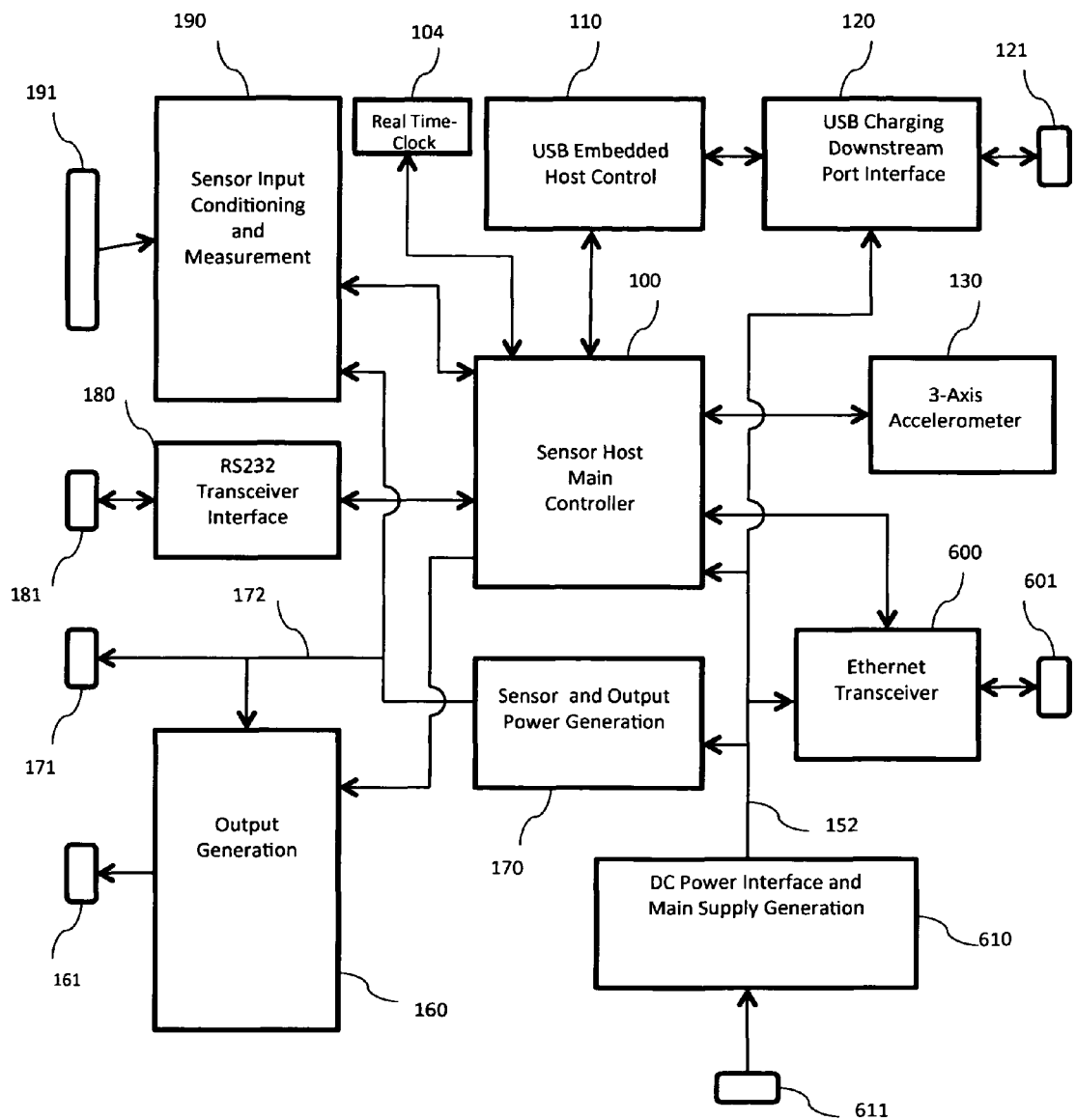
FIG. 6 is a functional block diagram of the Sensor and Power Coordinator for a Production Control and its power, communication, and operational connections.

FIG. 6 shows the preferred embodiment of the Production Control Coordinator 500 with more specific detail as to its functional blocks. Central control for the PPC 500 is handled by a Sensor Host Main Controller 100, which is responsible for all communication tasks, sensor reading, output control, and interfaces—subject to USB communication and control functionalities over data, which as was shown in FIG. 5 are communicated through the USBCDPI 13. (The memory for the Sensor Host Main Controller is not shown, as linking memory with a processor is standard in the existing art.)

Typically the USB Host function is done by the most capable and powerful computing platform in a system—where 'powerful' denotes the measurement of computational capability and/or memory, as distinct from electrical power transmission, generation, or storage capacity. Typically, also, the USB Host function includes providing electrical power to each connected device.

The present invention, however, recognizes that while as shown in FIG. 5 the most powerful computing platform will generally be the ND 21 and not the PPC 500, the relative measure is reversed when 'powerful' denotes electrical power transmission, generation, or storage capacity. If the ND 21 served as the USB Host for electrical power, then it would run down its battery and require recharging (very rapidly if trying to drive a fixed-point station's electrical system!). In the present invention the ND 21, while otherwise acting as the USB Host for data communication and control, hands that role as to electrical power over to the PPC 500, which accesses, manages, and shares any combination of DC power of the fixed-point station on which the ND 21 is mounted, instead of drawing electrical power from, and ceding control over electrical power provisioning to, the ND 21.

To have the ability to power a ND 21 directly, it is necessary for the Production Control Coordinator 500 to be a USB Host; accordingly, the USBCDPI 13 further comprises and provides at least one USB Embedded Host Control 110 connecting the Sensor Host Main Controller 100 to a USB Charging Downstream Port Interface 120. The USBCDPI 120 is also connected with the DC Power Interface and Main Supply Generation 610 which serves as the source for the power for all of the PPC 500, ND 21, sensors 61, 62, 63 and secondary elements respectively thereof.

A standard USB Host is able to provide 500 mA of current to an attached USB device. For the Production Control Coordinator 500 and its ND 21, this amount of electrical power would not be sufficient to operate many NDs for extended periods of time (or the vehicle at all). To surpass this hurdle, the Production Control Coordinator 500 implements a USB Charging Downstream Port Interface 120. Standard USB chargers may charge devices at higher current levels than 500 mA, but do so without any data communication. The USB Charging Downstream Port Interface 120 not only allows charging the ND 21 at up to 1.5 Amps (three times the standard capacity), but also enables and permits simultaneous communication over the USB interface simultaneously. The USB Charging Downstream Port Interface 120 connects to the ND 21 with a USB Controller 121. While this is more complex to implement than simple USB Device capability, it allows the Production Control Coordinator 500 to simultaneously communicate, power and charge any attached ND 21.

The Sensor Host Main Controller 100 in the preferred embodiment is further connected to a 3-Axis Accelerometer 130. This element principally determines the orientation of the Production Control Coordinator 500 in the fixed-point station in which it is mounted. When the fixed-point station is operating the 3-Axis Accelerometer 130 can be used to determine the orientation of the Production Control Coordinator 500 and thus the geopositioning and orientation of the vehicle itself. While the ND 21 may have any or all of gyroscope, accelerometer and compass elements and/or geopositioning information that would be useful to a positioning system, unfortunately, without knowing the relative orientations of both the ND 21 and the fixed-point station on which the PPC 500 is mounted, such would be of limited use and accuracy. However, by combining the geo-positioning information from both ND 21 and PPC 500, a fully integrated positioning determination can be made, not just to determine the orientation of the ND 21 within the vehicle but also, as with the best integrated positioning systems which use both GPS and Inertial Navigation signals, to improve the accuracy of determination of precisely where the vehicle is, including specifics of its orientation and position.

The 3-Axis Accelerometer 130 helps to make such additional information possible. An additional novel feature obtained through incorporation of the 3-Axis Accelerometer 130 is the ability to detect vibration and shaking. This information can be used to determine when the fixed-point station's transformational element (not shown) has shut down, and use that as a control signal to transition the PPC 500, and the ND 21, and any other connected elements, to low power operation. To allow this information to be used, the 3-Axis Accelerometer 130 is connected with the Sensor Host Main Controller 100.

The Sensor Host Main Controller 100 in the preferred embodiment is further connected with an Ethernet Transceiver 600 which is used to communicate with the production line's network or databus through the connection port 601 to obtain or share status information of interest to the production line and/or network.

The DC Power Interface and Main Supply Generation 610 connecting both with the Sensor Host Main Controller 100 and the USB Charging Downstream Port Interface 120, not only provides the means to power the PPC 500, ND 21, and sensors 61, 62, 63, but also comprises standard elements to handle variable voltage levels for different types of vehicles as well as protective elements against harsh overvoltage conditions that can occur. The power output of the DC Power Interface and Main Supply Generation 150 supplies 'clean' power (that adjusted to the much more tightly constrained limits of computational electrical subcomponents, than found or used by many machinery operational, power transmission, or electrical driver systems) to the Sensor Host Main Controller 100, the USB Bus 121 through the USB Charging Downstream Port Interface 120, the Ethernet Transceiver 600, and the Sensor and Output Power Generation 170, which then adjusts the electrical power to voltage levels that are suited to sensors 172 and control signals in the overall system.

The Output Generation 160 supports both digital control signals and Pulse Width Modulated control signals. Pulse Width Modulation permits various capabilities including generation of Analog signals with appropriate filtering and dimming of lights. The RS232 Transceiver Interface 180 is provided to communicate to more complex sensors systems that might have many inputs, or have only an RS232 interface. The Sensor Input Conditioning and Measurement Block 190 includes protecting against overvoltage and overcurrent conditions that might occur otherwise. Signals must be scaled for reading by the Sensor Host Main Controller 100 where they are read and transmitted to the ND 21.

The PPC 500 in the preferred embodiment also incorporates a Real-Time Clock 104, which tracks the current time and date for the PPC 500. The Real-Time Clock 104 is used to 'time-stamp' data from any of the sensors (61, 62, 63), which is then stored in the PPC's memory. The PPC 500 can also take input (control plus data) from the ND 21 to set the time of the Real Time Clock 104.

To allow data from any of sensors 61, 62, 63 or the 3-Axis Accelerometer 130, to be given temporal context, in the preferred embodiment a Real-Time-Clock 104 is connected with and controlled by the Sensor Host Main Controller 100. This allows the Sensor Host Main Controller 100 to take and store data from any or all of these inputs while no external nodal device is connected, and later, upon connection with an external nodal device, report the stored data to the now-connected external nodal device in a 'black box' function.

DETAILED DESCRIPTION

The present embodiment of the invention, the Sensor and Power Coordinator (SPC) is designed for the on the road Trucks, Port Handling Equipment, Cargo Moving equipment, and vehicles used in warehouses, or in an alternative embodiment, for fixed-station transformational equipment in a production line where such fixed-station equipment comprises both machinery and at least one associated sensor for a transformational operation upon a physical input. The SPC is a very low cost alternative to expensive and uniform Vehicle Mount Terminal solutions.

Each SPC 11 receives its electrical power directly from the vehicle and will provision electrical power to any set of at least one sensor, and at least one removably-emplaceable, handheld computational and communication device (cell phones, smartphones, handhelds, and tablets) or Nodal Device ('ND') which is emplaced into the SPC 11 when its human operator is going to use that specific vehicle to interoperate with the other vehicles, and humans, particularly those working within or up and to the limits of, that same warehouse. In the preferred embodiment the SPC 11 uses its connected memory to store data collected during periods of operation of the vehicle when no ND 21 is attached, which can be accessed by a human operator subsequently when he(she) attaches a ND 21 to that vehicle.

From that human operator's point of view each specific SPC 11 can be thought of as a Black Box that is permanently mounted on the vehicle and attached to various vehicle sensors. For display and interfacing purposes, the Sensor and Power Coordinator allows a computer inherent in any of a cellphone, smartphone (collectively, each instance of such is referenced hereafter as a "phone") or Tablet, to be either permanently attached to the vehicle, or to be attached by the operator when running the vehicle, through it to the vehicle's sensor(s) and function(s).

This permits employers to use a totally new paradigm: they can share employees' 'phones or tablet computers during vehicle operation, and can use the employees' phone or tablet computer as an automatic means of identification. In this mode, when an employee takes over a vehicle, he plugs his 'phone/tablet, using it as the ND 21, into that vehicle's particular SPC 11. This plug-in will spark both the SPC 11 and the now-connected 'phone/tablet, now the ND 21, to automatically log-in the employee as that specific vehicle's operator, and launch any pending software application which can now provide vehicle-and-operator-specific work instructions, vehicle tracking, sensor monitoring, and wireless communications.

It should be noted that specific vehicles may be functionally differentiated (forklift from crane from flatbed truck from conveyor belt), that individual handhelds, i.e. ND's 21 can also be functionally differentiated (tablet from smartphone, Fred's smartphone from Cecilia's smartphone), and that an individual operator and handheld or ND 21 can be shifted from one vehicle to another, with this invention empowering the vehicle/operator combination according to the collective limitations of the pairings as they are made (and changed, say at shift changes, or even mid-shift temporary adaptive reassignments).

A set of SPC's will be defined as those SPC's which share a common data, messaging, and control (operational and access authorizations) with and through the peripheral, nodal, handhelds as long as the latter be any of the tablet computer(s) and/or smartphone(s) currently active and accepted as authorized to belong to the interoperating organization. This has, as a consequence, the ease of reassignment across shifts as well as across functional and vehicle operations, allowing a far greater adaptability.

The present invention turns the approach used by the prior art on its head. Instead of requiring a single, central, standard-setting computational 'host', the device and system enables and uses a split 'co-hosting' approach. Instead of having one master device at each vehicle control all of the communications, power, display, and computation, the device and system divide the control and provisioning of electrical power, and of computational and display efforts; with electrical power being the responsibility of the vehicle-hosted but computationally 'dumber' device (which has at best a lesser-quality display), and display and computation the responsibility of whatever 'nodal device' (tablet, cell phone, or smartphone) is currently plugged into the vehicle.

Instead of a series of Login steps and having to remember their password, users are automatically authenticated with their phone/tablet. It is much easier for employees to share passwords and lose traceability than it is for them to give up their cell phones. An employee's phone is probably the biggest guarantee that they are actually in a vehicle. Passwords are easier to share than getting an employee to loan out a cellphone.

An employer doesn't need to pay a burdensome and continuous monthly charge for tracking vehicles when they are on the road. Instead, the employer could offer to share the employee's phone data plan expenses. This is a win-win that helps out both the employer and the employee.

The average cellular phone company works to have their customers shift to new hardware every 2-3 years. Typical fixed Vehicle Mount Terminal equipment requires usage for 5-8 years for return on investment calculations. This approach allows vehicles to be using up to date processing, display and interface technologies always. Employees that have older equipment will only have themselves to blame, and not their employer.

Employees don't want to be without their own tablet/cellphone. They are more likely to keep good care of their own equipment than vehicle mount equipment that they have no ownership for.

If the Tablet is company owned, the costs of repair will be much cheaper than for an expensive Vehicle Mount Terminal System. With Tablet costs such as the Google Nexus 7 costing below $300 ($200 for the WiFi-only version), the unit becomes virtually disposable when it breaks. An entirely new unit is cheaper than to repair the existing one.

When an operator gets into a vehicle, you never know what their phone/tablet charging status might be. Therefore, it is important to be prepared for all scenarios and to offer the employee a benefit too.

Simple USB Charging Devices provide power to a device for charging it, but don't allow USB communication at the same time. Therefore, a standard, simple USB Charger can't support the Sensor and Power Coordinator.

Architecturally, a processing platform such as a PC, Laptop or Tablet is typically a USB Host Controller. These devices typically have the greatest processing power, are general purpose and flexible in their capabilities, and usually have significant power sources. USB Host Functions require significant intelligence, and usually must support many items being plugged in. In a configuration where a small number of sensors are to be plugged into a phone or tablet, the intuitive approach is to have the phone or tablet be the host computer. The Sensor and Power Coordinator products turn this scenario on its head to provide an ideal implementation. In the present invention the roles of 'host' are split according to the differentiated capabilities of the fixed and attaching devices, with the computationally more powerful attaching device becoming the host for data and communications control, and the much lower 'intelligence' fixed device, the SPC which is linked to a greater source of electrical power, becoming the USB Host and power provisioning.

A typical USB Host (or a USB On-the-Go supporting device which is a newer alternative), can provide a maximum of 500 mA of current to an attached device. This is part of the USB standard. The problem is that most good sized tablet computers with displays suitable for Vehicle Mount Applications require significantly more than 500 mA of current for optimal viewing. In these types of scenarios, the tablet battery would run down, and eventually, the device would no longer communicate. This would be unacceptable for an industrial application where 24/7 operation is required. This invention uses a novel and distinctly contrary approach to surmount this limitation of traditional systems. The SPC 11 through its USBCDPI 13 meets the USB Battery Charging Specification 1.2 while still allowing dataflow in both directions. This allows the SPC 11 to keep a ND 21 operating continuously, not only without draining the ND 21's battery, but charging it!

Most vehicle power sources are not as 'clean' as might be desired, and can be subject to current drops, current surges, phase differences, and other irregularities in the electrical current flow, frequency, intensity, and phase—any of which may cause problems with or for any computational or communication circuitry that is in any of the sensors (61, 62, 63) or ND 21 connected with the SPC 11. While vehicle ignitions typically start with 12 volts, computer chips generally prefer much lower levels! Similarly, the means used to generate power on a vehicle are generally geared toward vehicle electrical standards, which are often much less 'clean' than microcircuitry can handle. Thus in a further embodiment of the invention the VPI 51 comprises at least one additional means to receive, use, and distribute an alternative ranged set of vehicle power source levels; and means to effect differing levels of 'clean' nature by balancing out any of the set of surges, phase irregularities, and drops in current flow which if not corrected can damaging more delicate electrical circuitry. In this further embodiment the SPC 11 interacts with the ND 21 to program the VPI 51 to handle alternative or a lesser set of vehicle power source levels appropriate to the sensor(s) and nodal device(s) that may connect to the SPC 11, and thus the SPC 11 be used by the operator to select which set of vehicle power source levels, sensors (61, 62, 63), and ND 21 currently connected with the SPC 11 are to be powered through the SPC 11.

If a ND 21 supports simultaneous voice and data transmissions, then the Sensor and Power Coordinator can operate and report information during an employee phone call. For employees who are expected to take phone calls while operating vehicles, the act of having the phone or tablet plugged into the SPC will not impact their ability to take calls. Employees using this ND 21 for voice calls during vehicle operation, in the preferred embodiment, will have a Bluetooth connection to the ND 21. This is made more important due to the fact that the ND 21 is hardwire connected to the Sensor and Power Coordinator, which is also controlling and providing the electrical power for the ND 21.

The SPC incorporates general purpose, industry-standard connections (for inputs and outputs). This allows one device, the SPC, to support a variety of differentiated ND's 21 and through them, a variety of multiple applications; and also permits the user to expand their use of the SPC to take advantage of, support, and enable new capabilities over time.

Key status information about the SPC's attachments can allow different work programs to be automatically launched based on what vehicle an operator is running—or based on what ND 21 the operator attaches to the SPC 11.

A key innovation in the SPC 11 is the inclusion of a low cost 3-Axis Accelerometer. The SPC 11 is intended to be permanently attached to a specific vehicle. As that vehicle is operated, the SPC 11, and thus the vehicle's, orientation can be calculated using these accelerometer outputs. Knowledge of this orientation will be continuously improved over time. This orientation is critical for any sort of fine positioning or decision processes that involve other sensors such as wheel counters, laser rangers, etc. that can be tied directly to the SPC 11 as one of the sensors (61, 62, 63).

The simple software interface for the SPC 11 makes it easy for any operator to add a new type of sensor. The SPC 11 sends the sensor data to the ND 21 where it can either be displayed, or transmitted back to a host system. The SPC's Embedded Software permits all control and modification to be made from the ND 21 acting as the computational host machine, using the SPC interface software and the ND's controls and display. This provides a single point of user interaction with the system.

The SPC 11 further comprises connections to a number of standard interfaces. This allows a wide range of sensor devices or complete products such as bar-code scanners to be tied to the SPC 11. However, as the sensor devices use the SPC interface software, the user with the ND 21 will not have to learn a different command language for each device.

What is more novel is that the ND 21 that is attached to the SPC will likely have more accurate Gyroscopes, Accelerometers, Compasses or other sensors. The employee might set the ND 21 on the seat, in a cradle, or in a mount with an adjustable position for best viewing. Since the ND 21 could be in a wide range of orientations, the fixed Accelerometer values from the SPC 11 can be used to simplify the orientation of the ND 21 to the SPC 11 and by extension, the vehicle.

The interface is presently over USB as the underlying physical layer. Commands will be sent bi-directionally using an XML packet format, and may, and in a further embodiment will, be encrypted (as will the data). Otherwise, someone can put a USB sniffer on the connection and look at all of the packets.

The SPC 11 in the preferred embodiment comprises means for Ethernet connection, wherein said means comprise having the Sensor Host Main Controller 100 further connected with any of an Ethernet Transceiver or physical Ethernet connection.

In a further embodiment, the user who is authenticated may instantiate his own encryption process between his peripheral and the network host. With multiple, different, encryption processes, none of which are shared beyond the last link separating the mobile node from the centralizing host(s), the ability of any third party to penetrate the entirety of the system degrades, not just linearly but potentially geometrically with the increasing number of last link nodes.

A. Message Types:

There will initially be three types of messages: setup, data, and alert. The setup messages will be sent at the beginning of a session, and are used to configure what data will be sent, how frequently it will be sent, and how it will be presented. The data messages will contain Time-stamped values corresponding to the value of associated sensors.

A.1: Setup Messages:

There are two forms of setup messages. These are pin configuration messages, and filtering messages. The onboard accelerometers are automatically configured to be operating, but the user can decide whether to Enable or Disable the processing and sending of their data.

The preferred embodiment of the SPC 11 will comprise an embedded microprocessor suited for production or moderate-capacity computational devices (such as a 32 Bit PIC Microprocessor by Microchip, as opposed to a core microprocessor for the high-end computers such as 64-bit Intel i7-3840QM Processor) and in charge of its computational, communication and control activities. The SPC 11 also comprises an Analog/Digital Converter ("ADC") connected and communicating with, if it is not a part of, the embedded microprocessor and also connected and communicating with the means to route multiple analog inputs to the ADC, and thus at least one sensor for its data (concerning any of the vehicle's condition, operational state or environment). The preferred embodiment will also comprise at least 2 4-20 mA Analog Inputs that will be sampled with the ADC in the PIC. A typical 3-Axis Accelerometer such as the ADXL345 by Analog Devices produces digital outputs at rates up to 3200 Samples/second. Most analog or digital inputs in the SPC 11 will not require sampling at greater than 100 Hz. Therefore, if the 3-Axis Accelerometer data is to be used in conjunction with slower sampled input data, it will usually be necessary to decimate accelerometer data sent to the ND 21. Accelerometer data can be very noisy especially in a vehicle, and it is generally desirable to filter the data. The preferred filtering will introduce Group Delay into the signal, and to properly time correlate the filtered data with other inputs that are unfiltered, this Group Delay must be accounted for. The preferred embodiment provides various filter cutoff frequencies, sampling rates, correlated Group Delays, and samples/sec sent to the Node Device (e.g. a Tablet computer) as shown in Table 1, to lessen any degree of adaptive experimentation.

SPC 11 to store information about the vehicle and from its sensor(s) even though the vehicle is being operated when a ND 21 is not connected. Later, a ND 21 could download this information. All timing information in the preferred embodiment, and thus for the Real Time Clock, is in Binary Coded Decimal YY:MM:DD: HH:MM:SS format (WKDY will not be sent or used).

For analog inputs, in the preferred embodiment values are reported for in volts and the time values are spread evenly across the period of the overall message, which corresponds to 100 msec. Messages will be used for digital and counter input configuration, accelerometer inputs, and Com Port receiving.

Some messages in the preferred embodiment are asynchronously transmitted from the ND 21 to the SPC 11 over an XML interface. These messages will generally be infrequent or at random intervals, so they will be transmitted over XML as soon as they are ready. This is as opposed to interfaces which bundle data in messages to reduce the number of transmissions. Among these messages are open collector outputs (messages for Digital Output configuration), PWM (messages for analog output configuration), and Com Port transmitting messages.

A.3: Alert Messages

These messages generally comprise error codes or other non-data information between the elements such as sensors 61, 62, 63, SPC 11, and ND 21. These messages are the means for host communication and control which are not already delineated above as belonging to either the authorization or data communication functions. The SPC 11, or the contact/communication linkage with an individual ND

TABLE 1

Filtering for Accelerometer Inputs (All Handled Equivalently)

| XML Name | 3rd order Butterworth Filter Cutoff Frequency | Reset State | Sampling Rate for ADXL345 | Group Delay for 0 Hz | Group Delay for Cutoff Frequency | Input Sample Shift for Group Delay | Samples/sec to Tablet |
|---|---|---|---|---|---|---|---|
| XYZ_ACCEL | "Cutoff = None" | "Cutoff = None" | 3200 Hz | 0 msec | 0 msec | 0 | 2000 |
| | "Cutoff = 1,000 Hz" | | 3200 Hz | 0.2 msec | 0.5 msec | 1 | 2000 |
| | "Cutoff = 400 Hz" | | 3200 Hz | 0.8 msec | 0.5 msec | 2 | 1000 |
| | "Cutoff = 200 Hz" | | 800 Hz | 1 msec | 3 msec | 1 | 500 |
| | "Cutoff = 100 Hz" | | 800 Hz | 3 msec | 5 msec | 2 | 250 |
| | "Cutoff = 40 Hz" | | 200 Hz | 7 msec | 13 msec | 1 | 100 |
| | "Cutoff = 20 Hz" | | 200 Hz | 15 msec | 22 msec | 3 | 50 |
| | "Cutoff = 10 Hz" | | 50 Hz | 28 msec | 53 msec | 1 | 25 |
| | "Cutoff = 4 Hz" | | 50 Hz | 78 msec | 111 msec | 4 | 10 |
| | "Cutoff = 2 Hz" | | 25 Hz | 162 msec | 232 msec | 4 | 5 |
| | "Cutoff = 1 Hz" | | 25 Hz | 330 msec | 457 msec | 8 | 5 |

A.2: Data Messages

Data messages can either read an analog or digital input, or they can be used to write an output. They can also report counter input values and set PWM output information. The following messages are asynchronously transmitted from the SPC 11 to the ND 21 over an XML interface. To minimize the number of messages, and to help with time-stamping, the preferred embodiment will send messages every 100 msec (10 per second) that include all of the data for the previous period, and data will be packaged in a oldest in, first out format.

Sensor Data in the preferred embodiment is time stamped. The SPC 11 has a Real Time Clock. It is critical that the ND 21 can either set or read these values. The "Black Box Mode" of operation in the preferred embodiment allows the

21, may need to be reset; or the pair must detect and respond to failure of that nodal link (or of another nodal link); or the pair must cooperatively coordinate the power management function; or a new host upgrade (as distinguished from a nodal device's upgrade) must be communicated and coordinated.

In the preferred embodiment should the SPC 11 reset for some reason, it sends a message to the ND 21 to that effect immediately. The presumes that the USB interface will still be active, and needs to be verified.

In the preferred embodiment if the SPC 11 detects a short circuit on the 18V supplies, or the 5V external Supply, it sends an alert through the ND 21 to its display and possibly onwards using the set of communication links 21, 22, 23.

A.3.1: System Stability Signal—the 'Heartbeat' Message

Both SPC 11 and ND 21 in the preferred embodiment will send reciprocally and regularly, confirmation of continued systemic connectivity and stability—a 'Heartbeat Message'—every second. This will be used to maintain the connection 15 and to decide whether any link or element, or the entire set, needs to be restarted. As a secondary function this could also serve as a 'clocking' coordination.

However, while the 'heartbeat' message from the SPC 11 will include a timestamp, that from the ND 21 to the SPC 11 will not, to avoid confusing the two elements' internal clocks. If time comparisons need to be done, they should be handled in the ND 21 by its more readily accessible, updateable, and connected software.

A.3.2: Power Management Messages

Both SPC 11 and ND 21 have potentially independent, yet cooperating, reasons where they may need to manage their power consumption. In the case of the SPC 11, it will detect that the vehicle is not on, and will start a time process to put itself and the ND 21 connected to it in standby. In the case of the ND 21, there will be cases where the user wishes to put the SPC 11 into standby mode. So a 'standby' or power-management independence message is part of the preferred embodiment and when sent or received triggers automatically an embedded response.

A.3.3: Time Setting Message

This message is used in the preferred embodiment to set the Real Time Clock which is part of the Sensor Host Main Controller 100. If the ND 21 wants to get the real time, it is available in the Heartbeat messages. The Sensor Host Main Controller 100 stores an additional WKDY field (i.e. Sunday, Monday, . . . Saturday), but this is not necessarily important for the applications of the ND 21. Therefore, this will not be set, and will not be sent in Time Stamps.

Since each ND 21 is presumed to be operative, and operated, outside this invention's connection and communication, as the individual owner takes it off work, any particular ND 21 may have its time set to a different value between connections. (For example, the user may take a vacation trip into another time zone and have his smartphone or tablet reset its 'home time' to that temporary change; then forget to undo that change before returning to work.) Also, the network may have one or more hosts and nodes operating across a time zone boundary. By allowing not just the individual SPC 11 or ND 21, but the set of host(s) and node(s) to communicate with Time Setting Messages, these differences can be detected and either tracked to a geographically-diverse 'real time' definitional distinction, or corrected as to a mutually-shared 'common time' for operational functionality.

SPECIFIC EXAMPLES AND VARIATIONS

In a first possible scenario, the Employer can purchase a specific ND 21 such as a Tablet computer, and permanently mount it on the vehicle. In this case, the SPC 11 continually charges the Tablet computer while it is being used in operation. This scenario will still require operator log-in through the Tablet computer to indicate who is using that specific vehicle.

In a second scenario, the employer purchases a particular ND 21 such as a Tablet computer for each employee who may operate equipment. The employee-specific ND 21 will have embedded in it that employee's specific, automatic, login, which will preclude the need for login screens and procedures; whenever a specific employee physically connects his ND 21 to a SPC-equipped vehicle, that triggers the automatic login and registration of the employee with that vehicle. Employees always take their own ND 21 to each vehicle they will be operating.

In a third scenario, the employer shares the employee's ND 21 (tablet or phone) while at work. The employee is authenticated and logged into the system automatically when they connect their ND 21 to the SPC 11. The vehicle-specific application for that SPC will automatically launch on the employee's tablet or phone based on the type of vehicle that is being operated (and, in a further embodiment, on the employee's registered task skills and qualifications). The SPC 11 is permanently attached to a specific vehicle and it knows what it is attached to. When any ND 21 is attached, this information is communicated up through to the USB connection.

In certain applications, the operator of the SPC 11 and ND 21 may wish to monitor many additional sensors. In a further embodiment the means for detecting and operating a subset of devices ('Controlled Functions') of the vehicle through the SPC 11 comprise a Vehicle Controller Area Network ('CAN') Interface 31, or a Controller Area Network Transceiver 140, to be able to monitor the main vehicle operation bus, connected with the main vehicle operation bus and the main processor of the SPC 11. In addition, many external sensors for temperature, distance, pressure, latches and other in-vehicle controls or state-setting devices can be supported.

In yet a further embodiment the SPC 11 supports external Serial RS-232 devices (and USB devices in coming revisions) that could include external GPS, WLAN or Cellular interfaces, or devices such as bar code scanners, with a RS-232 Transceiver Interface 180 connected with both the Sensor Host Main Controller 100 and the Sensor and Output Power Generation 170, and the external interfaces or devices (collectively, 171).

In yet a further embodiment the USBCDPI 13 will alternatively comprise any set of physical wire, or wireless (e.g. inductive) charging and communication linkages.

In yet a further embodiment, the SPC 11 further comprises an authentication subsystem for authenticating an external nodal device when connected with the SPC 11 as one authorized to access and use the vehicle to which the SPC 11 is fixably mounted; and means for constraining the operational control of the vehicle including any combination of a set of alarm signaling, vehicle function shutdown, locational signaling, and vehicle operational shutdown, to be effected for any non-authenticated-user interaction, when a connected external nodal device does not satisfy the authentication subsystem.

In yet a further embodiment the Sensor and Power Coordinator ('SPC')'s authentication subsystem further incorporates and interacts with user-selected encryption from the external nodal device (ND 21).

In yet a further embodiment means for constraining the operational control of the vehicle embodied in the SPC 11 further comprise issuing, or communicating commands from or through the ND 21, which effect a constraining the operational activities of the vehicle by an set of activities, locations, time limits, or combination thereof, as determined by the existence or lack of appropriate authentication of the external nodal device (ND 21) attached to the SPC's vehicle, as established within the SPC 11 prior to the external nodal device being attached for authentication.

It is possible for the invention as herein described to be used, in an alternative embodiment, as a production control device wherein for each fixed-point station a Production Control Coordinator 500 ('PCC' which other than the name, analogous to the SPC 11) is affixed, and to which any of a set of tools, sensors, and moveable, replaceable, and interoperative nodal devices (analogous to the ND 21) may be connected.

The PCC 500 has built in Ethernet connectivity for a reliable high speed connection alternative that is always connected if desired. The PCC 500 allows a totally new paradigm for operator tracking. One of many possible setups allows an operator to plug their own ND 21 ('phone or tablet computer) into the PCC 500 when they move to a new work station on the production floor. This would automatically log the user into the network, and would automatically launch the software application on the ND 21 ('phone/tablet computer) that is appropriate for the specific work station. When sensor inputs and work instructions are then passed to the ND 21 ('phone/tablet), they are automatically tagged and customized for that specific user.

While this invention has been described in reference to illustrative embodiments, this description is not to be construed in a limiting sense. Various modifications and combinations of the illustrative embodiments as well as other embodiments of the invention will be apparent to those skilled in the art upon referencing this disclosure. It is therefore intended this disclosure encompass any such modifications or embodiments.

The scope of this invention includes any combination of the elements from the different embodiments disclosed in this specification, and is not limited to the specifics of the preferred embodiment or any of the alternative embodiments. Individual configurations and embodiments of this invention may contain all, or less than all, of the elements disclosed in the specification according to the needs and desires of a user. The claims stated herein should also be read as including those elements which are not necessary to the invention yet are in the prior art and are necessary to the overall function of that particular claim, and should be read as including, to the maximum extent permissible by law, known functional equivalents to the elements disclosed in the specification, even though those specific functional equivalents are not exhaustively detailed herein.

The tables and messages herein are not limiting but instructive of the embodiment of the invention, and variations which are readily derived through transformations which are standard or known to the appropriate art are not excluded by omission. Accordingly, it is intended that the appended claims be interpreted to cover all alterations and modifications as fall within the true spirit and scope of the invention in light of the prior art.

Additionally, although claims have been formulated in this application to particular combinations of elements, it should be understood that the scope of the disclosure of the present application also includes any single novel element or any novel combination of elements disclosed herein, either explicitly or implicitly, whether or not it relates to the same invention as presently claimed in any claim and whether or not it mitigates any or all of the same technical problems as does the present invention. The applicant hereby give notices that new claims may be formulated to such features and/or combinations of such features during the prosecution of the present application or of any further application derived therefrom.

I claim:

1. A Sensor and Power Coordinator ('SPC') for a vehicle having at least one sensor for data relating to any set of the vehicle's condition, operational state, and external environment, said SPC both coordinating computational and communication data display and control from, and data reporting to, an external nodal device, and provisioning electrical power from said vehicle's internal power source to said external nodal device, said SPC being mounted in that vehicle and further comprising:
   a main processor;
   memory connected to said main processor;
   an analog-to-digital converter connected with said main processor and with said at least one sensor for its data;
   means for power provisioning connected with and controlled by said main processor and connected with and provisioning power for and to said external nodal device when said external nodal device is connected with said SPC;
   means for provisioning power to, receiving data from, and sending sensor control signals to the at least one sensor through a link capable of both power and reciprocal data and control transmission;
   an authentication subsystem for authenticating an external nodal device when connected with the SPC as one authorized to access and use the vehicle to which the SPC is fixably mounted; said authentication subsystem further comprising:
      means for constraining the operational control of the vehicle including any combination of a set of alarm signaling, vehicle function shutdown, locational signaling, and vehicle operational shutdown, to be effected for any non-authenticated-user interaction when a connected external nodal device does not satisfy the authentication subsystem; and,
      means for incorporating and interacting with user-selected encryption from the external nodal device; and,
   means for Universal Serial Bus ('USB') interoperability further comprising:
      a USB Embedded Host controller connected with said main processor;
      a USB charging downstream port interface connected to said USB Embedded Host controller and said means for power provisioning; and
      at least one USB physical connector for at least one said external nodal device connected with said USB charging downstream port interface, with which the external nodal device will connect to the SPC.

2. A Sensor and Power Coordinator ('SPC') as in claim 1, further comprising a three-axis accelerometer connected with said main processor.

3. A Sensor and Power Coordinator ('SPC') for a vehicle having at least one sensor for data relating to any set of the vehicle's condition, operational state, and external environment, said SPC both coordinating computational and communication data display and control from, and data reporting to, an external nodal device, and provisioning electrical power from said vehicle's internal power source to said external nodal device, said SPC being mounted in that vehicle and further comprising:
   a Sensor Host Main Controller, further comprising:
      a main processor; and,
      memory connected to said main processor;
   an analog-to-digital converter connected with said main processor and with said at least one sensor for its data;
   means for power provisioning connected with and controlled by said main processor and connected with and provisioning power for and to said external nodal device when said external nodal device is connected with said SPC;
   means for provisioning power to, receiving data from, and sending sensor control signals to the at least one sensor through a link capable of both power and reciprocal data and control transmission;

an authentication subsystem for authenticating an external nodal device when connected with the SPC as one authorized to access and use the vehicle to which the SPC is fixably mounted; said authentication subsystem further comprising:

means for constraining the operational control of the vehicle including any combination of a set of alarm signaling, vehicle function shutdown, locational signaling, and vehicle operational shutdown, to be effected for any non-authenticated-user interaction when a connected external nodal device does not satisfy the authentication subsystem; and, means for incorporating and interacting with user-selected encryption from the external nodal device;

means for Universal Serial Bus ('USB') interoperability further comprising:

a USB Embedded Host controller connected with said main processor;

a USB charging downstream port interface connected to said USB Embedded Host controller and said means for power provisioning; and at least one USB physical connector for at least one said external nodal device connected with said USB charging downstream port interface, with which the external nodal device will connect to the SPC;

a Real-Time Clock connected with said main processor; and, a three-axis accelerometer connected with said main processor.

4. A Sensor and Power Coordinator ('SPC') as in claim 3 further comprising means for detecting and operating a subset of devices ('Controlled Functions') of the vehicle.

5. A Sensor and Power Coordinator ('SPC') as in claim 4, wherein the means for detecting and operating a subset of devices ('Controlled Functions') of the vehicle, comprise a Vehicle Controller Area Network ('VCAN') Interface connected with the main vehicle operation bus, and connected with said main processor.

6. A Sensor and Power Coordinator ('SPC') as in claim 4, wherein said means for power provisioning connected with and controlled by said main processor and connected with and provisioning power for and to said external nodal device when said external nodal device is connected with said SPC further comprise a Vehicle Power Interface and Main Supply Generation element, also connecting with said USB Charging Downstream Port Interface.

7. A Sensor and Power Coordinator ('SPC') as in claim 6 further comprising:

a Sensor Input Conditioning and Measurement element connected with the at least one sensor for data relating to any set of the vehicle's condition, operational state, and external environment, and which is also connected with and reporting data to and receiving control from said Sensor Host Main Controller;

an RS-232 Transceiver Interface connected with said Sensor Host Main Controller;

an Output Generation element connected with and reporting data to and receiving control from said Sensor Host Main Controller, and connected with and receiving power from a Sensor and Output Power Generation element, which is connected with said Vehicle Power Interface and Main Supply Generation element and also with said Sensor Input Conditioning and Measurement element.

8. A Sensor and Power Coordinator ('SPC') as in claim 4, further comprising:

means for generating, modulating, and reading digital signals, including control signals; and, means for modulating and sending Pulse Width Modulated analog signals.

9. A Sensor and Power Coordinator ('SPC') as in claim 3, wherein the means for constraining the operational control of the vehicle further comprising constraining the operational activities of the vehicle by any set of activities, locations, time limits, or combination thereof, as determined by the existence or lack of appropriate authentication of the external nodal device attached to the SPC's vehicle, as established within the SPC prior to the external nodal device being attached for authentication.

10. A Sensor and Power Coordinator ('SPC') as in claim 3 wherein the means for power provisioning connected with and controlled by said main processor and connected with and provisioning power for and to said external nodal device when said external nodal device is connected with said SPC comprise any of the set of physical wire or inductive charging means.

11. A Sensor and Power Coordinator ('SPC') as in claim 3, wherein said means for power provisioning connected with and controlled by said main processor and connected with and provisioning power for and to said external nodal device when said external nodal device is connected with said SPC further comprise means to receive, use, and distribute a ranged set of vehicle power source levels comprising any of 12V and 24 VDC, and to effect differing levels of power conditioning by balancing out any of the set of surges, phase irregularities, and drops in current flow which if not corrected can damage electrical microcircuitry.

12. A Sensor and Power Coordinator ('SPC') for a vehicle having at least one sensor for data external to the vehicle, said SPC both coordinating computational and communication data display and control from, and data reporting to, an external nodal device, and provisioning electrical power from said vehicle's internal power source to said external nodal device, said SPC being mounted in that vehicle and further comprising:

a main processor;

memory connected with said main processor;

an analog-to-digital converter connected with said main processor and with said at least one sensor for data external to the vehicle;

means for power provisioning connected with and controlled by said main processor and connected with and provisioning power for and to said external nodal device when said external nodal device is connected with said SPC;

means for provisioning power to, receiving data from, and sending sensor control signals to the at least one sensor through a link capable of both power and reciprocal data and control transmission;

an authentication subsystem for authenticating an external nodal device when connected with the SPC as one authorized to access and use the vehicle to which the SPC is fixably mounted; said authentication subsystem further comprising:

means for constraining the operational control of the vehicle including any combination of a set of alarm signaling, vehicle function shutdown, locational signaling, and vehicle operational shutdown, to be effected for any non-authenticated-user interaction when a connected external nodal device does not satisfy the authentication subsystem; and, means for incorporating and interacting with user-selected encryption from the external nodal device;
means for Universal Serial Bus ('USB') interoperability further comprising:
   a USB Embedded Host controller connected with said main processor;
   a USB charging downstream port interface connected to said USB Embedded Host controller and said means for power provisioning; and
   at least one USB physical connector for at least one said external nodal device connected with said USB charging downstream port interface, with which the external nodal device will connect to the SPC;
a Real-Time Clock connected with said main processor; and,
a three-axis accelerometer connected with said main processor;
a Vehicle Controller Area Network ('VCAN') Interface connected with the main vehicle operation bus, and connected with said main processor;
a Sensor Input Conditioning and Measurement element connected with the at least one sensor for data external to the vehicle, and which is also connected with and reporting data to and receiving control from said main processor;
an RS-232 Transceiver Interface connected with said main processor;
an Output Generation element connected with and reporting data to and receiving control from said main processor, and connected with and receiving power from a Sensor and Output Power Generation element, which is connected with said means for power provisioning and also with said Sensor Input Conditioning and Measurement element; and
an Ethernet connection.

13. A Production Control Coordinator ('PPC') fixedly attached to a first fixed-point station in a production line, said first fixed-point station comprising at least one transformational machine and at least one sensor associated with said transformational machine to effect a transformation on a physical input, said PPC both coordinating computational and communication data display and control from, and data reporting to, an external nodal device and provisioning electrical power from said PPC's internal power source to said external nodal device, said Production Control Coordinator further comprising:
   a main processor;
   memory connected with said main processor;
   an analog-to-digital converter connected with said main processor and with said at least one sensor for data external to the first fixed-point station;
   means for power provisioning connected with and controlled by said main processor and connected with and provisioning power for and to said external nodal device when said external nodal device is connected with said PPC;
   means for provisioning power to, receiving data from, and sending sensor control signals to the at least one sensor through a link capable of both power and reciprocal data and control transmission;
   an authentication subsystem for authenticating an external nodal device when connected with the PPC, as one authorized to access and use the transformational machine of that PPC; said authentication subsystem further comprising:
      means for constraining the operational control of the transformational machine including any combination of a set of alarm signaling, function shutdown, data reporting signaling, and PPC operational shutdown, to be effected for any non-authenticated-user interaction when a connected external nodal device does not satisfy the authentication subsystem; and,
      means for incorporating and interacting with user-selected encryption from the external nodal device; and,
   means for Universal Serial Bus ('USB') interoperability further comprising:
      a USB Embedded Host controller connected with said main processor;
      a USB charging downstream port interface connected to said USB Embedded Host controller and said means for power provisioning; and
      at least one USB physical connector for at least one said external nodal device connected with said USB charging downstream port interface, with which the external nodal device will connect to the PPC.

14. A Production Control Coordinator ('PPC') as in claim 13 wherein said means for power provisioning further comprise a DC power connection and means for provisioning a ranged set of DC power source levels including 12V and 24 VDC and of differing levels of power conditioning to said Production Control Coordinator and said USB charging downstream port interface.

15. A Production Control Coordinator ('PPC') as in claim 14 further comprising:
   a Real Time Clock;
   a 3-Axis Accelerometer; and,
   an Ethernet Transceiver.

16. A Production Control Coordinator (PPC) as in claim 15, further comprising:
   a communications link to at least a second fixed-point station on a production line where said second fixed-point station also has a fixedly-attached second Production Control Coordinator, said second fixed-point station transformational machine being different in transformational effect;
   wherein an exchange of coordination signals is effected by at least one of the first fixed-point station and second fixed-point station operators; and,
wherein said first fixed-point station orders a first transformation from its transformational machine, and subsequently said second fixed-point station orders a second transformation from its transformational machine, all upon the same physical input with that second transformation being dependent the first transformation being successfully completed.

* * * * *